Patented Aug. 12, 1947

2,425,693

UNITED STATES PATENT OFFICE 2,425,693

PREPARATION OF AMINOPROPIONITRILES

Elmer W. Cook, New York, N. Y., and Philip H. Moss, Greenwich, Conn., assignors to American Cyanamid Company, New York, N. Y., a corporation of Maine No Drawing. Application November 22, 1944, Serial No. 564,710

3 Claims. (Cl. 260—247)

1

The present invention relates to the production of aminonitriles and more particularly to a method of preparing N-substituted β-aminopropionitriles which conform to the general formula

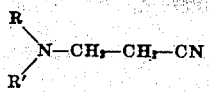

wherein R represents an alkyl radical, R' represents either hydrogen or an alkyl radical, and R and R' when taken together with the nitrogen atom represent a heterocyclic ring.

We have discovered that amino compounds of the above type may be obtained by reacting a β-alkoxypropionitrile with either a primary or secondary alkyl amine or a heterocyclic amine which contains a hydrogen atom connected to nitrogen such as, for example, piperidine, morpholine, piperazine, α-pipecoline, anabasine and the like.

Typical reactions may be illustrated as follows:

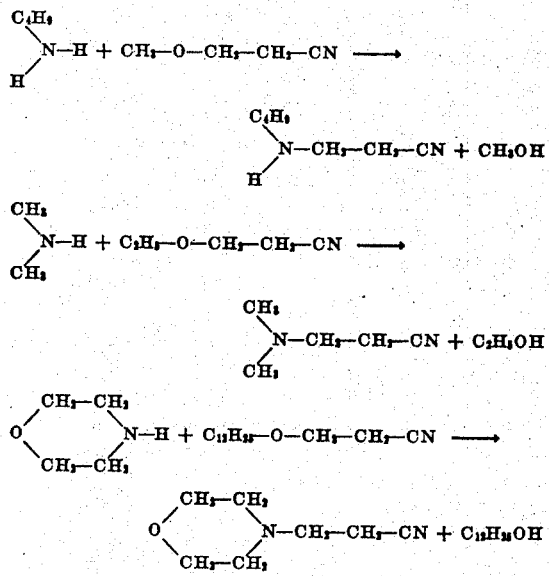

The amine and the alkoxypropionitrile when heated together in a pressure vessel at temperatures ranging from 150 to about 230° C. react readily to produce the β-aminopropionitrile.

The reaction may be carried out in the presence of solvents or diluents such as, for example, dibutyl ether, dioxane, carbon tetrachloride, cycloaliphatic or aromatic hydrocarbons, or miscible mixtures thereof.

2

The following specific examples will further illustrate the invention.

Example 1

792 grams (9.32 mols) of β-methoxypropionitrile and 440 grams (9.78 moles) of dimethylamine were heated in an autoclave at 185–200° C. for 3.5 hours. The reaction product was distilled under reduced pressure. β-dimethylaminopropionitrile, B. P. 80° C./29 mm., was obtained in a yield of 88.3%.

Example 2

A mixture consisting of 85 grams (1 mol) of piperidine and 85 grams (1 mol) of β-methoxypropionitrile was heated in a closed vessel at 200° C. for 3 hours. Distillation of the reaction product under vacuum gave 100 grams (79.7% yield) of β-N-piperidinopropionitrile, B. P. 123.5° C./26 mm.

Example 3

36 grams of morpholine and 35.2 grams of β-methoxypropionitrile were heated in an autoclave at 190–200° C. for 3 hours. Distillation of the reaction product gave β-N-morpholinopropionitrile boiling at 148–150° C./26 mm.

Example 4

99 grams of β-ethoxypropionitrile and 85 grams of piperidine were heated in an autoclave at 200–210° C. for 3.5 hours. Distillation of the reaction product under reduced pressure gave 80 grams (58% yield) of β-N-piperidinopropionitrile.

Example 5

85 grams of β-methoxypropionitrile and 73 grams of n-butylamine were heated in a closed vessel at 180–190° C. for 3.5 hours. The reaction product was distilled under vacuum. 62 grams of β-n-butylaminopropionitrile, B. P. 119° C./26 mm., were obtained.

Example 6

A mixture consisting of 129 grams of di-n-butylamine and 71 grams of β-methoxypropionitrile was heated in an autoclave at 190–200° C. for 3 hours. Distillation of the reaction product under reduced pressure gave β-(di-n-butylamino) propionitrile boiling at 97–103° C./2 mm.

Example 7

59.6 grams of piperidine and 159 grams of β-dodecoxypropionitrile were heated together for 5 hours in an autoclave at 200° C. The product was vacuum distilled, giving 45 grams of β-N-piperidinopropionitrile.

The present invention provides a simple and convenient method of preparing a group of compounds which may be employed as intermediates for the production of germicidal agents and assistants for the textile and related industries.

While the invention has been described with particular reference to specific embodiments, it is to be understood that it is not to be limited thereto but is to be construed broadly and restricted solely by the scope of the appended claims.

We claim:

1. A method of producing an N-substituted β-aminopropionitrile which comprises reacting a β-alkoxypropionitrile with a compound chosen from the group consisting of a heterocyclic amine which contains a hydrogen atom connected to nitrogen, and an alkyl amine of the formula

wherein R represents an alkyl radical and R' is a member of the group consisting of hydrogen and an alkyl radical under pressure at a temperature from 150 to 230° C.

2. A method of producing a β-dialkylaminopropionitrile which comprises reacting a β-alkoxypropionitrile with a dialkylamine under pressure at a temperature from 150 to 230° C.

3. A method of producing β-dimethylaminopropionitrile which comprises reacting β-methoxypropionitrile with dimethylamine under pressure at a temperature from 150 to 230° C.

ELMER W. COOK.
PHILIP H. MOSS.

REFERENCES CITED

The following references are of record in the file of this patent:

UNITED STATES PATENTS

| Number | Name | Date |
|---|---|---|
| 2,335,605 | Paden et al. | Nov. 30, 1943 |
| 2,349,222 | Goshorn | May 16, 1944 |
| 2,017,051 | Arnold et al. | Oct. 15, 1935 |
| 2,085,679 | Gluud et al. | June 29, 1937 |
| 2,211,152 | Nicodemus et al. | Aug. 13, 1940 |
| 1,992,615 | Hoffman et al. | Feb. 26, 1935 |

OTHER REFERENCES

Bruylants, Beilstein, vol. 3, 2d Suppl., pages 221–222 (1942).

Stoermer et al., Ber. Deut. Chem., vol. 47, page 1792 (1917).